(12) United States Patent
Zhou

(10) Patent No.: US 8,248,765 B2
(45) Date of Patent: Aug. 21, 2012

(54) PORTABLE ELECTRONIC DEVICE

(75) Inventor: Ri Zhou, Shenzhen (CN)

(73) Assignees: Shenzhen Futaihong Precision Industry Co., Ltd., ShenZhen, Guangdong Province (CN); Chi Mei Communication Systems, Inc., Tu-Cheng, New Taipei (TW)

( * ) Notice: Subject to any disclaimer, the term of this patent is extended or adjusted under 35 U.S.C. 154(b) by 260 days.

(21) Appl. No.: 12/755,482

(22) Filed: Apr. 7, 2010

(65) Prior Publication Data

US 2011/0007460 A1  Jan. 13, 2011

(30) Foreign Application Priority Data

Jul. 13, 2009 (CN) .......................... 2009 1 0304302

(51) Int. Cl.
*H05K 7/16* (2006.01)

(52) U.S. Cl. ......... 361/679.01; 361/679.55; 361/679.27; 455/575.3

(58) Field of Classification Search ............. 361/679.08, 361/679.09, 679.21, 679.22, 679.26, 679.55, 361/679.56, 679.27, 679.5, 679.01; 455/575.1–575.4
See application file for complete search history.

(56) References Cited

U.S. PATENT DOCUMENTS

| 2008/0194303 | A1* | 8/2008 | Takagi et al. | 455/575.3 |
| 2010/0248795 | A1* | 9/2010 | Sugimori et al. | 455/575.1 |

* cited by examiner

*Primary Examiner* — Jinhee Lee
*Assistant Examiner* — Ingrid Wright
(74) *Attorney, Agent, or Firm* — Altis Law Group, Inc.

(57) ABSTRACT

A portable electronic device comprises a cover section, a body section, a tilting adjuster and a rotating adjuster. The body section is adjustably coupled with the cover section. One end of the tilting adjuster is hinged to the body section. One end of the rotating adjuster is hinged to the cover section, the other end of the rotating adjuster is hinged to the other end of the tilting adjuster.

19 Claims, 7 Drawing Sheets

US 8,248,765 B2

PORTABLE ELECTRONIC DEVICE

BACKGROUND

1. Technical Field

The exemplary invention relates to portable electronic devices, especially to portable electronic device that can have the position of their display adjusted.

2. Description of Related Art

Portable electronic devices with displays, especially portable Audio/Video products are widely used. Considering consumers' requirements for multiple-angled displays, some portable electronic devices have brackets fixed to them. The portable electronic device can "sit" on the desk by propping up the bracket. Thus, users can have a comfortable view of the display.

However, many existing portable electronic products cannot have the length of their support mechanism adjusted. Therefore, the supporting angle of the portable electronic product cannot be freely adjusted.

Therefore, there is room for improvement within the art.

BRIEF DESCRIPTION OF THE DRAWINGS

Many aspects of the portable electronic device can be better understood with reference to the following drawings. The components in the drawings are not necessarily to scale, the emphasis instead being placed upon clearly illustrating the principles of the present hinge assembly. Moreover, in the drawings, like reference numerals designate corresponding parts throughout the several views, in which.

DETAILED DESCRIPTION OF THE EMBODIMENTS

Figure 1:
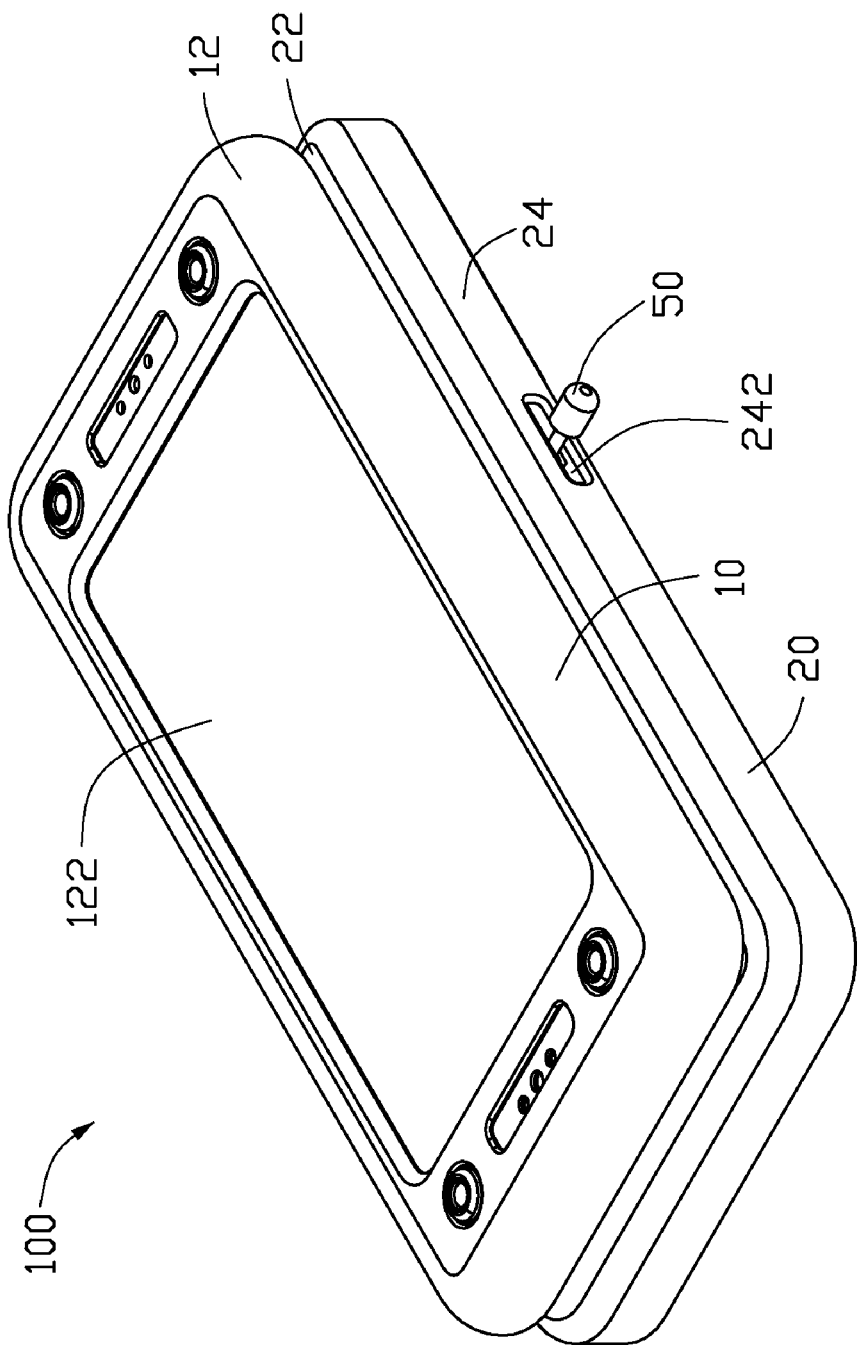
FIG. 1 is an assembled view of an exemplary embodiment of a portable electronic device including a cover section, a body section, a tilting adjuster, a rotating adjuster, and two triggers.
Figure 2:
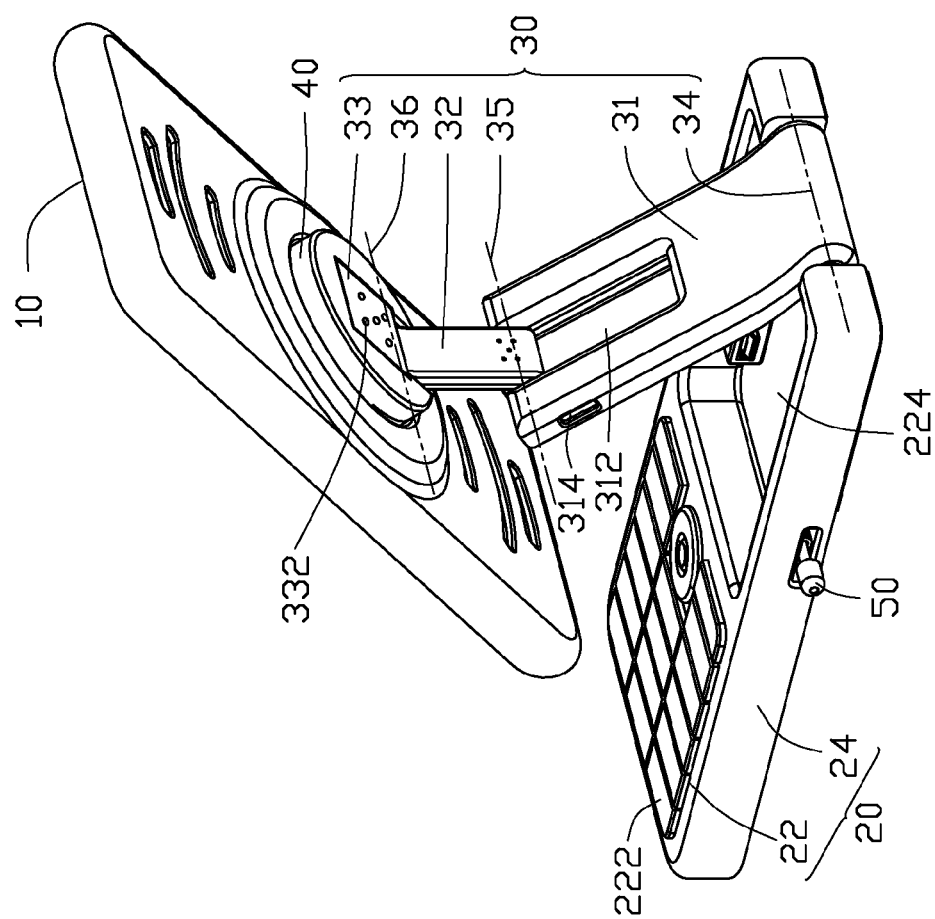
FIG. 2 is similar to FIG. 1, but the cover section is located in an opened position.

Referring now to the drawings, FIGS. 1 and 2, show a foldable electronic device 100 such as a flip type mobile phone, which includes a cover section 10 and a body section 20 adjustably coupled with the cover section 10 through a tilting adjuster 30 and a rotating adjuster 40 and under the control of two triggers 50.

The cover section 10 has an inner surface (not labeled) facing the body section 20 and an outer surface 12 opposite to the inner surface. The rotating adjuster 40 is mounted on the inner surface of the cover section 10. The cover section 10 has a display 122 (e.g. LCD) placed on a center of the outer surface 12.

The body section 20 has a first surface 22 facing the cover section 10 and two side surfaces 24 connecting with the first surface 22, respectively. The body section 20 has a keyboard 222 mounted on the first surface 22 adjacent to one end of the body section 20, and a mounting portion 224 defined on the first surface 22 adjacent to another end of the body section 20. In this exemplary embodiment, the mounting portion 224 is a concave defined in the first surface 22. The triggers 50 are situated in the side surfaces 24 of the body section 20. The triggers 50 are configured to trigger the tilting adjuster 30 so that the cover section 10 tilts relative to the body section 20.

Figure 3:
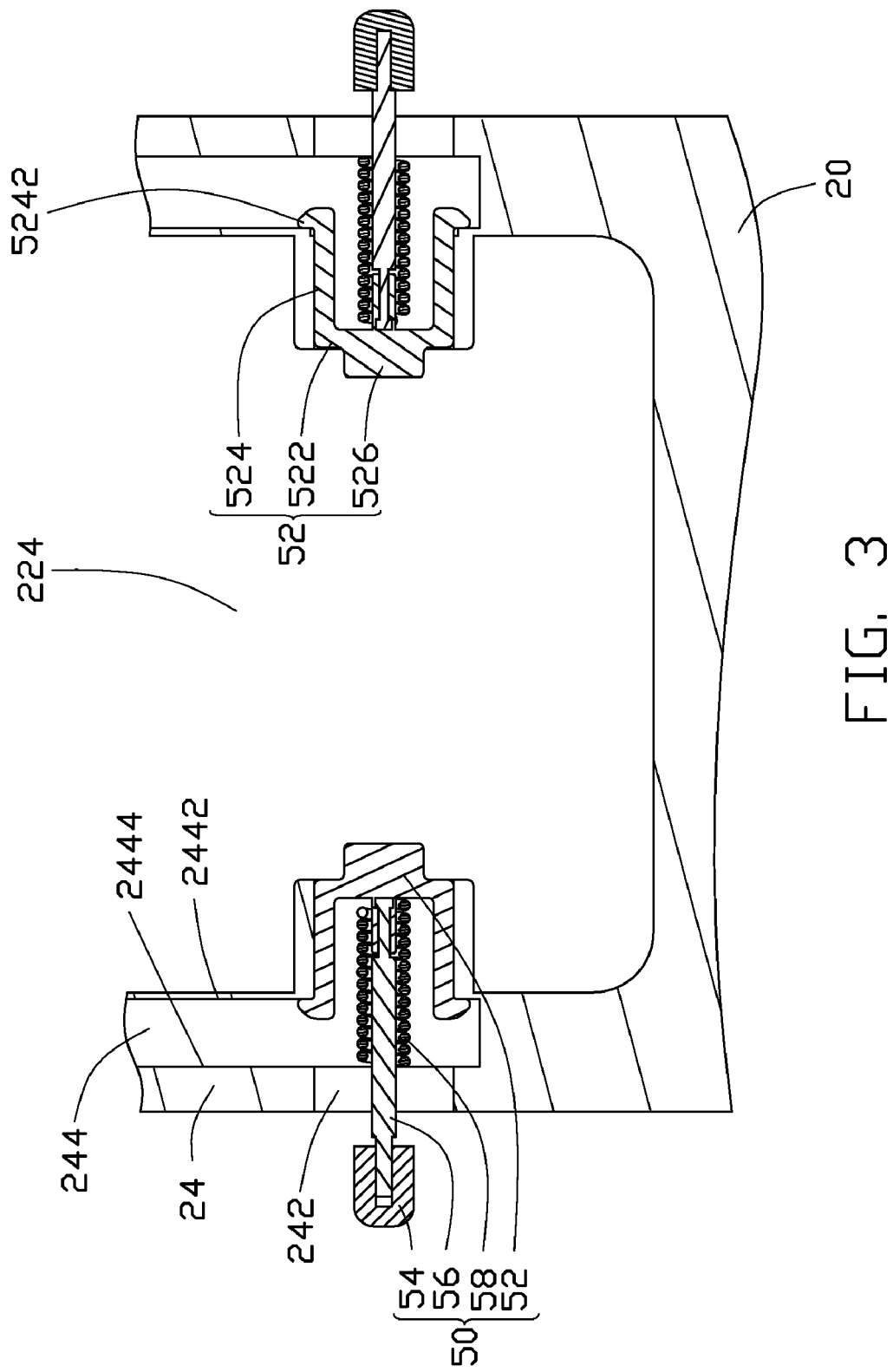
FIG. 3 is an enlarged partially cross-sectional view of the cover section and the triggers both shown in FIG. 1.

Referring to FIG. 3, each side surface 24 of the body section 20 has a passage 242 defined therethrough communicating with the mounting portion 224 and a groove 244 defined therein crossing with the passage 242, and a first inner wall 2442 and a second inner wall 2444 formed in the groove 244. The passages 242 and the grooves 244 are configured to engage with the triggers 50. The function of the first inner walls 2442 and the second inner walls 2444 will be described in more detail below.

Referring back to FIG. 2, the tilting adjuster 30 includes a first tilting board 31, a second tilting board 32, a retaining board 33, a torsion spring hinge 34, a first friction hinge 35, a second friction hinge 36. The torsion spring hinge 34 may be any hinge which can provide torsion force to make the first tilting board 31 rotate relative to the body section 20. The first friction hinge 35 and the second friction hinge 36 may be any hinges which can provide any angle between two elements. One end of the first tilting board 31 is hinged to body section 20 by the torsion spring hinge 34, the other end of the first tilting board 31 is hinged with one end of the second tilting board 32 through the first friction hinge 35. The first tilting board 31 has a receiving slot 312 defined therein for accommodating the second tilting board 32 when the second tilting board 32 is flipped towards the first tilting board 31. The first tilting board 31 further has two latching slots 314 respectively defined in two side surfaces thereof. The latching slots 314 are configured to retain the first tilting board 31 in the mounting portion 224. The other end of the second tilting board 32 is hinged to the retaining board 33 through the second friction hinge 36. The retaining board 33 has a plurality of screw holes 332 defined therein for mounting the tilting adjuster 30 to the cover section 10.

Figure 4:
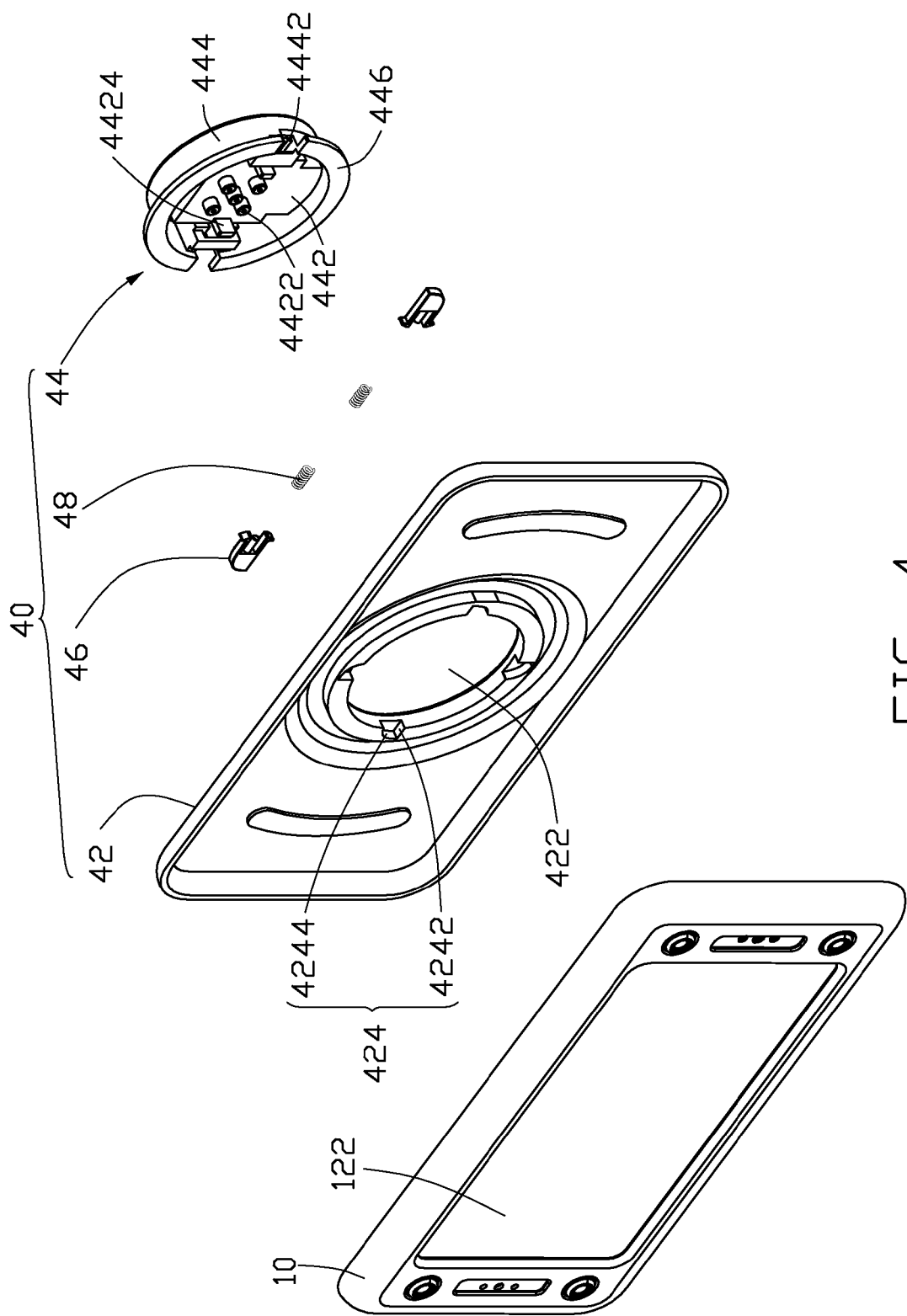
FIG. 4 is a partially exploded view of the cover section and the rotating adjuster both shown in FIG. 1.

Referring to FIG. 4, the rotating adjuster 40 includes a mounting plate 42, a rotating member 44, two retractable member 46 and two first coil springs 48. The mounting plate 42 is mounted to the cover section 10 and has a circular opening 422 defined therethrough engaging with the rotating member 44. The mounting plate 42 has two equally-spaced notches 424 defined in an inner wall of the opening 422. Each notch 424 is defined by a planar surface 4242 radially situated and an arcuate surface 4244 connecting the planar surface 4242.

The rotating member 44 includes a circular bottom wall 442, an annular peripheral wall 444 protruding from an outer boundary of the bottom wall 442 and a flange 446 protruding outwardly from an distal end of the peripheral wall 444. The bottom wall 442 has a plurality of threaded holes 4422 defined therethrough corresponding to the screw holes 332 of the retaining board 33 and two opposite resisting blocks 4424 protruding from an inner side thereof. The resisting blocks 4424 are configured to resist against the first coil springs 48. The peripheral wall 444 has two holes 4442 defined therethrough corresponding to the resisting blocks 4424, respectively. The holes 4442 are configured to mount the retractable member 46 to the rotating member 44. The flange 446 is attached to an inner surface of the mounting plate 42 to prevent the rotating member 44 from separating from the mounting plate 42.

Figure 5:
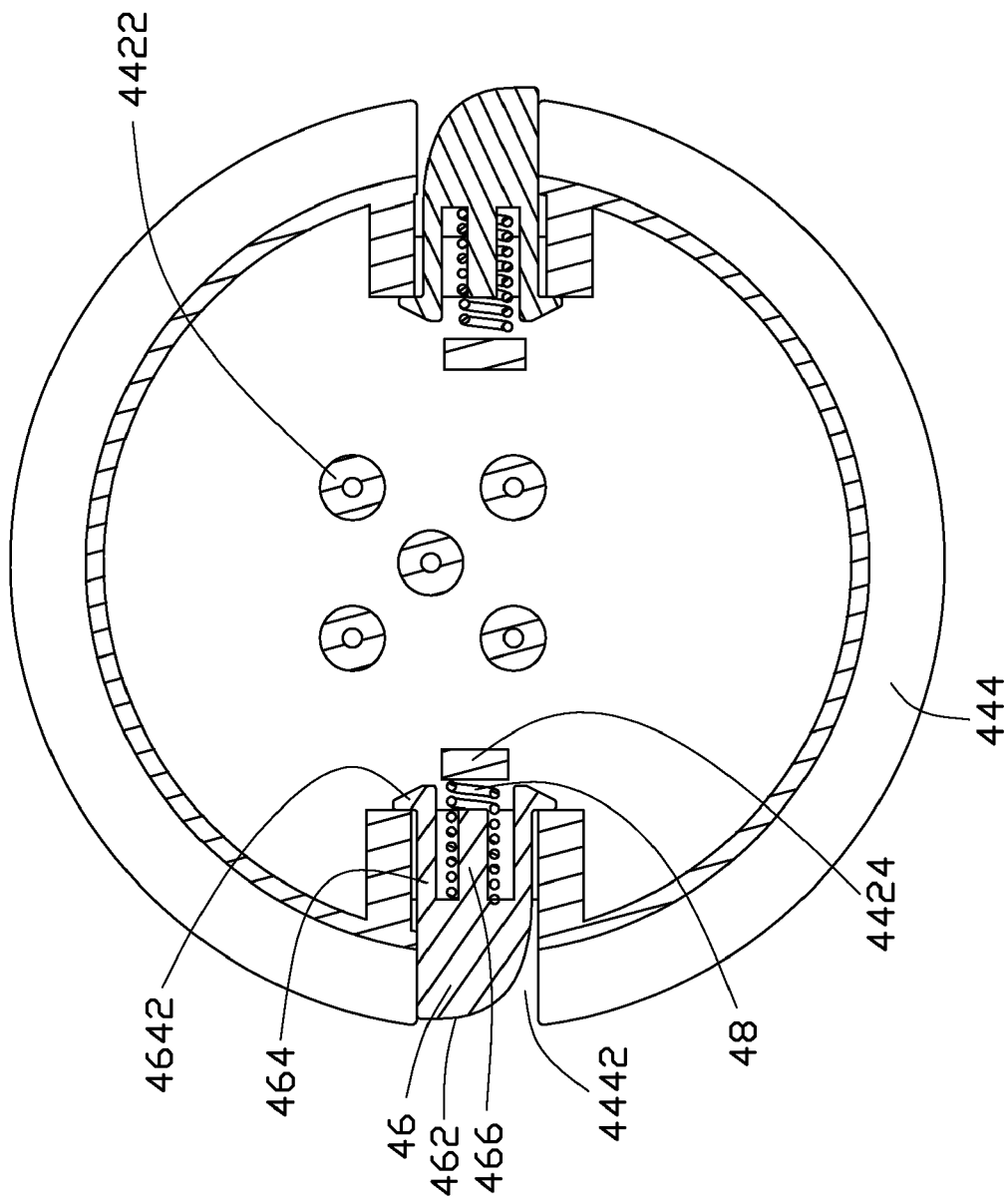
FIG. 5 is a cross sectional view of the rotating adjuster shown in FIG. 1 except a mounting plate.

Referring to FIG. 5, one end of the retractable member 46 is a wedged end 462 facing the mounting plate 42. The wedged ends 462 have the same shape and size as that of the notches 424, the other end of each retractable member 46 has two spaced arm 464 extending outwardly and a fixing pole 466 protruding between the spaced arms 464. Each arm 464 has a limiting portion 4642 protruding therefrom for preventing the retractable member 46 from separating from the rotating member 44. The fixing poles 466 are configured to wind the first coil springs 48 on the retractable member 46.

Referring to FIG. 3, each trigger 50 includes a slider 52, an operating portion 54, a rod 56 connecting the slider 52 with the operating portion 54, and a second coil spring 58 wound on the rod 56. Each slider 52 is substantially U-shaped, and includes a base 522, two opposite cantilevers 524 extending from two ends of the base 522, a wedged latching portion 526 extending from the base 522 opposite to the cantilevers 524. The latching portion 526 is configured to latch with the latching slots 314 of the first tilting board 31 to retain the first tilting board 31 in mounting portion 224 of the body section 20. The rod 56 is extended from the base 522 and located between the cantilevers 524. Each cantilever 524 has a stopping portion 5242 bent outwardly from a distal end thereof.

Referring to FIG. 3, during assembly: first, the triggers 50 are respectively mounted to the body section 20; In this state, the sliders 52 are accommodated in the corresponding passages 242; the latching portions 526 are exposed out of the corresponding passages 242 and extended into the mounting portion 224; the stopping portions 5242 resist against the corresponding first inner walls 2442 in the grooves 244 to stopping the sliders 52 escaped from the body section 20; the first coil springs 58 are compressed between the corresponding bases 522 and the corresponding second inner walls 2444, and the operating portions 54 is exposed out of the corresponding passages 242 to facilitate operating the triggers 50.

Referring to FIG. 2, secondly, the first tilting board 31 is hinged to the body section 20 through the torsion spring hinge 34; the second tilting board 32 is hinged to the first tilting board 31 through the first friction hinge 35, and the retaining board 33 is hinged with the second tilting board 32 through the second friction hinge 36. Thus, the tilting adjuster 30 is assembled yet.

Figure 6:
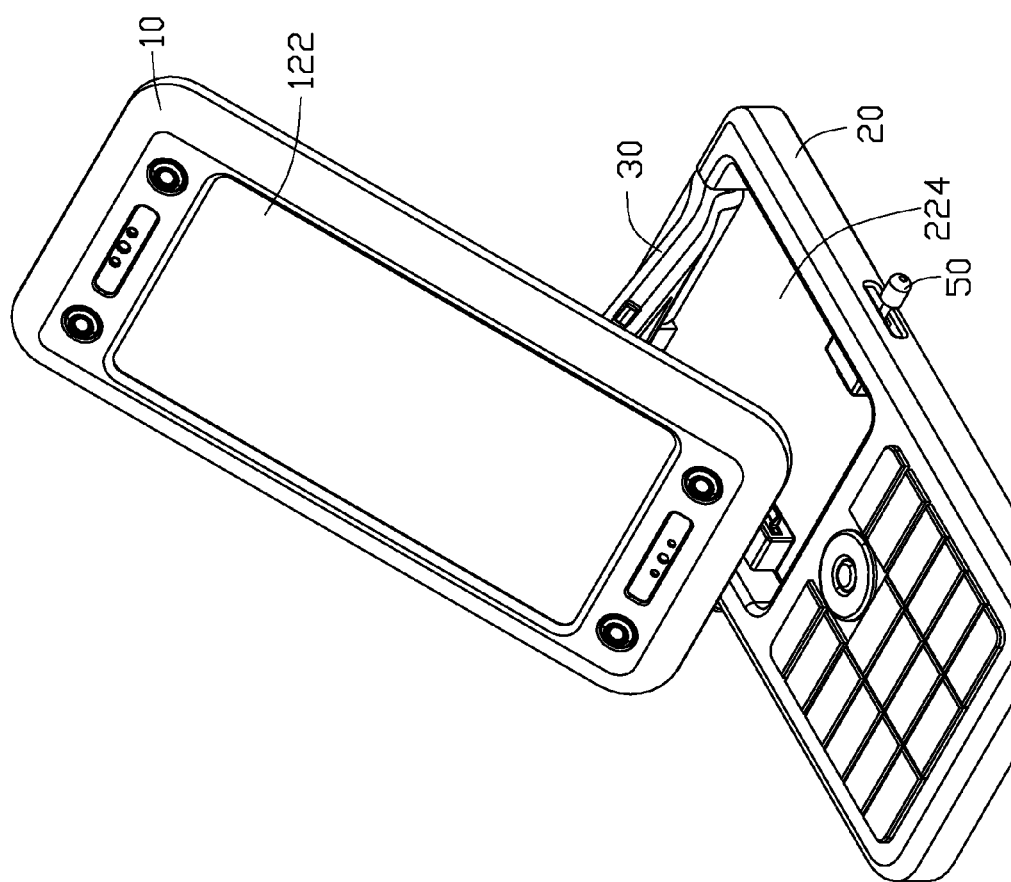
FIG. 6 is similar to FIG. 2, but viewing the portable electronic device from an another aspect.

Referring to FIGS. 4-6, thirdly, the rotating adjuster 40 is assembled together like below: the first coil springs 48 are wound to the fixing poles 466 of the corresponding retractable members 46; the retractable members 46 are then inserted into the corresponding holes 4442 of the rotating member 44, at this time, the first coil springs 48 are compressed between the corresponding resisting blocks 4424 and the corresponding retractable members 46, the limiting portions 4642 are resisted against the inner wall of the rotating member 44 under the resilient force of the corresponding compressed first coil springs 48, to prevent the retractable members 46 from separating from the rotating member 44. After that, the rotating member 44 is aligned with the opening 422 of the mounting plate 42 and is pushed toward the mounting plate 42 until the peripheral wall 444 of the rotating member 44 is accommodated in the opening 422. At this stage, the flange 446 of the rotating member 44 resists against the inner wall of the mounting plate 42 to prevent the rotating member 44 from separating from the mounting plate 42; the wedged ends 462 of the retractable members 46 are accommodated in notches 424 so that the rotating member 44 is steadily retained in the opening 422 of the mounting plate 42.

Then, referring to FIG. 2, the rotating adjuster 40 is mounted to cover section 10 and the bottom wall 442 of the rotating member 44 is bolted with the retaining board 33 by one or more nuts (not shown) to assemble the rotating adjuster 40 and the tilting adjuster 30 together. Finally, the cover section 10 is pressed toward the body section 20, the cover section 10 is rotated about the second friction hinge 36 relative to the second tilting board 32 until the cover section is parallel to the body section 20, the second tilting board 32 is rotated about the first friction hinge 35 relative to the first tilting board 31 until the second tilting board 32 is accommodated in the receiving slot 312, and the first tilting board 31 is rotated about the torsion spring hinge 34 relative to the body section 20 until the first tilting board 31 is accommodated in the mounting portion 224 and the latching portions 526 of the triggers 50 are latched within the latching slots 314 of the first tilting board 31, so that the portable electronic device is assembled like showing of the FIG. 1.

Figure 7:
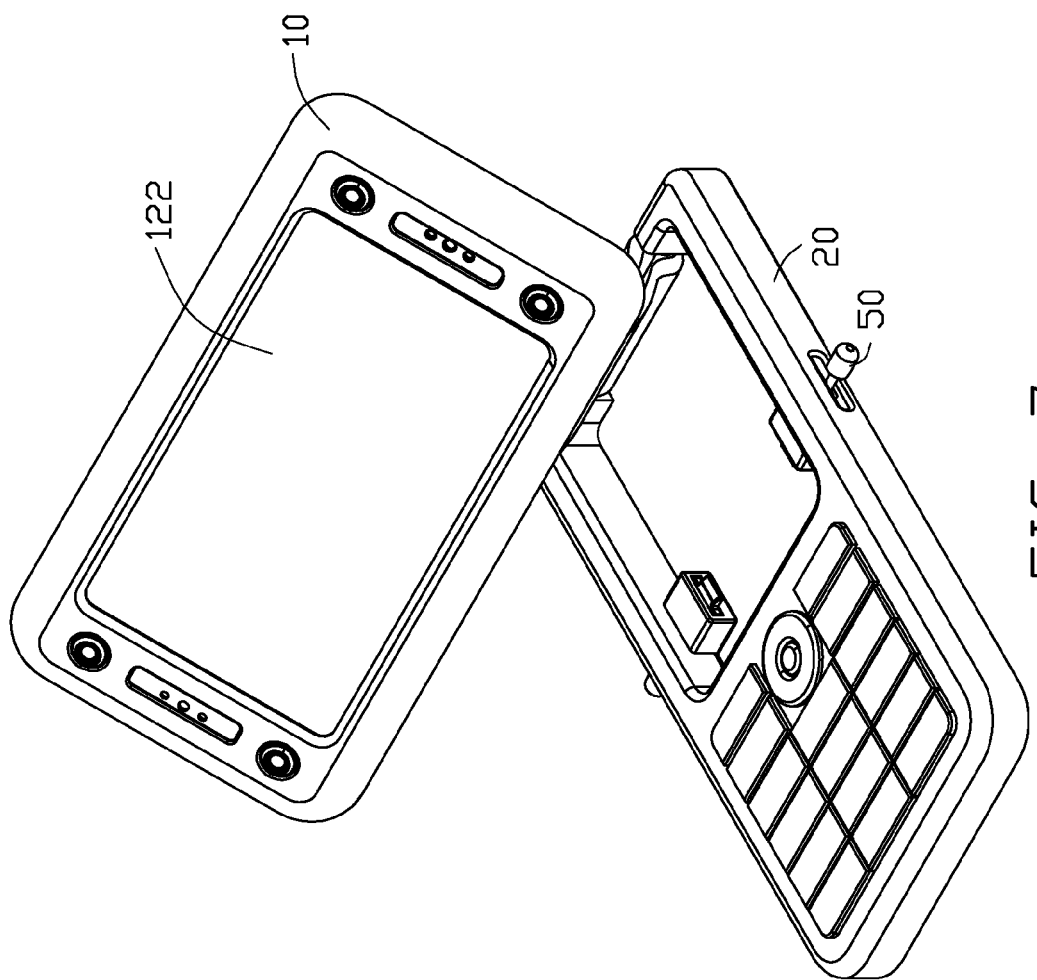
FIG. 7 is a schematic view of the portable electronic device when the cover section crosses with the body section.

In use, referring to FIGS. 1-3, the operating portions 54 are pulled outwardly from the mounting portion 224 of the body section 20 until the latching portions 526 of the triggers 50 are disengaged from the latching slots 314 of the first tilting board 31. At this time, the second coil springs 58 are continuously compressed by the corresponding sliders 52 to accumulate resilient force. Then, the first tilting board 31 is ejected out of the mounting portion 224 through the torsion spring hinge 34. After then, a user can adjust the first friction hinge 35 and the second friction hinge 36 to adjust the angle of the cover section 10 relative to the body section 20 until getting a comfortable viewing angle, such as shown in FIG. 7. Additionally, the latching portions 526 are pushed into the mounting portion 224 under the resilient force of the corresponding second coil springs 58.

Referring to FIGS. 2 and 7, when a user want the display 122 crossing with the body section 20, the cover section 10 can be rotated about the rotating member 44 of the rotating adjuster 40, and the detail is: rotating the cover section 10 about the rotating member 44, the wedged ends 462 of the retractable members 46 are slid along the arcuate surfaces 4244 in the notches 424 and the first coil springs 48 are continuously compressed, until the retractable members 46 are aligned with the other notches 424. At this time, the first coil springs 48 are stretched to push the retractable members 46 into the other notches 424, thus the portable electronic device is steadily positioned in a status of the cover section 10 crossing with the body section 20.

It is to be understood, that the planar surfaces 4242 in the notches 424 of FIG. 4 can be substituted to other shape, for example: an arcuate surface 4244; correspondingly, so that the cover section 10 can be clockwise/counterclockwise rotated relative to the body section 20.

It is to be understood that the second tilting board 32 may be directly hinged to the rotating adjuster 40, and the retaining board 33 is omitted.

It is to be understood that the mount of the notches 424 may be changed according to the actual need, for instance: the mount of the notches 424 may be three or four couples. Moreover, the mount of the notches 424 may be only two and the rotating adjuster 40 has only one retractable member 46; at this case, the retractable member 46 is releasably accommodated in the notches 424 in turn, for steadily retaining the cover section 10 in a certain position.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A portable electronic device, comprising:
   a cover section;
   a body section adjustably coupled with the cover section;
   a tilting adjuster, one end of the tilting adjuster being hinged to the body section; and
   a rotating adjuster, one end of the rotating adjuster being hinged to the cover section, the other end of the rotating adjuster being hinged to the other end of the tilting adjuster such that the cover section is capable of being folded up and rotate relative to the body section;
   the tilting adjuster includes a first tilting board and a second tilting board; one end of the first tilting board is hinged to the body section, the other end of the first tilting board is hinged with one end of the second tilting board, the other end of the second tilting board is hinged to the rotating adjuster.

2. The hinge assembly as claimed in claim 1, wherein the tilting adjuster further includes a torsion spring hinge; the first tilting board is hinged to the body section using the torsion spring hinge.

3. The hinge assembly as claimed in claim 1, wherein the tilting adjuster further includes a first friction hinge and a second friction hinge; the first tilting board are hinged with the second tilting board using the first friction hinge, the second tilting board is hinged to the rotating adjuster using the second friction hinge.

4. The hinge assembly as claimed in claim 3, wherein the rotating adjuster includes a mounting plate and a rotating member; the mounting plate is mounted to the cover section, the rotating member is rotatably mounted in the mounting plate and is hinged to the second tilting board.

5. The hinge assembly as claimed in claim 4, wherein the mounting plate has a circular opening defined therethrough; the rotating member includes a circular bottom wall and an annular peripheral wall protruding from an outer boundary of the bottom wall; the peripheral wall is rotatably accommodated in the opening.

6. The hinge assembly as claimed in claim 5, wherein the mounting plate has at least one notches defined in an inner wall of the opening; the rotating member further includes a retractable member releasably and selectively accommodated in the notches.

7. The hinge assembly as claimed in claim 6, wherein the bottom wall of the rotating member has a resisting block protruding therefrom; the peripheral wall of the rotating member has a hole defined therethrough corresponding to the resisting block; the retractable members are slidably accommodated in the hole; the rotating adjuster further includes a first coil spring which is compressed between the resisting block and the retractable member.

8. The hinge assembly as claimed in claim 7, wherein each notch is defined by a planar surface radially situated and an arcuate surface connecting the planar surface; one end of the retractable member is a wedged end facing the mounting plate, the wedged end has the same shape and size as that of the notches; the wedged end is slidalby accommodated in the notches in turn.

9. The hinge assembly as claimed in claim 8, wherein the other end of the retractable member has two spaced arm extending outwardly; each arm has a limiting portion protruding therefrom and resist an inner surface of the peripheral wall of the rotating member.

10. The hinge assembly as claimed in claim 9, wherein the retractable member has a fixing pole protruding between the spaced arms; the fixing pole is configured to wind the first coil springs on the retractable member.

11. The hinge assembly as claimed in claim 1, wherein the first tilting board has a receiving slot defined therein for accommodating the second tilting board.

12. The hinge assembly as claimed in claim 1, wherein the first tilting board further has a latching slot defined in two opposite sidewalls thereof; the portable electronic device further includes a trigger slidably mounted to the body section; the trigger has a latching portion corresponding to the latching slot of the first tilting board; the latching portion is releasably latched with the latching slot.

13. The hinge assembly as claimed in claim 12, wherein the trigger includes a slider and a second coil spring; the slider is slidably mounted in the body section; the latching portion is protrude from one end of the slider; the second coil spring is compressed between the slider and the body section.

14. The hinge assembly as claimed in claim 13, wherein the body section has a first surface facing the cover section and a side surface connecting with the first surface; the body section has a mounting portion defined in the first surface and configured to mount the tilting adjuster.

15. The hinge assembly as claimed in claim 14, wherein the side surface of the body section has a passage defined therethrough communicating with the mounting portion and a groove defined therein crossing with the passage, and a first inner wall and a second inner wall formed in the groove; the slider is slidably accommodated in the passage; the slider further includes a cantilever protruding from each end thereof opposite to the latching portion; each cantilever has a stopping portion bent outwardly from a distal end thereof and resisting against the first inner wall in the groove.

16. The hinge assembly as claimed in claim 15, wherein the trigger further includes a rod protruding therefrom between the cantilever;
   the second coil spring is wound on the rod and is compressed between the second inner wall and the slider.

17. The hinge assembly as claimed in claim 16, wherein the trigger further includes a operating portion protruding from an distal end of the rod and exposed out of body section.

18. The hinge assembly as claimed in claim 15, wherein the latching portion passes through the passage and extends into mounting portion.

19. The hinge assembly as claimed in claim 15, wherein the mounting portion is a concave defined in the first surface of the body section.

* * * * *